(12) United States Patent
Du et al.

(10) Patent No.: US 12,509,378 B2
(45) Date of Patent: Dec. 30, 2025

(54) INTELLIGENT MODULAR MEMBRANE-BASED INTEGRATED APPARATUS AND METHOD FOR RURAL DOMESTIC SEWAGE TREATMENT

(71) Applicant: TIANJIN WATER CONSERVANCY ENGINEERING GROUP CO., LTD., Tianjin (CN)

(72) Inventors: Hui Du, Tianjin (CN); Hongfei Li, Tianjin (CN); Cong Huang, Tianjin (CN); Benqiang Liang, Tianjin (CN); Zuodong Wu, Tianjin (CN); Gang Wu, Tianjin (CN)

(73) Assignee: TIANJIN WATER CONSERVANCY ENGINEERING GROUP CO., LTD., Tianjin (CN)

( * ) Notice: Subject to any disclaimer, the term of this patent is extended or adjusted under 35 U.S.C. 154(b) by 0 days.

(21) Appl. No.: 19/227,274

(22) Filed: Jun. 3, 2025

(65) Prior Publication Data
US 2025/0289739 A1 Sep. 18, 2025

Related U.S. Application Data

(63) Continuation of application No. PCT/CN2024/124996, filed on Oct. 15, 2024.

(30) Foreign Application Priority Data

Oct. 17, 2023 (CN) .................. 202311343069.X (51) Int. Cl.
C02F 3/12 (2023.01)
C02F 3/30 (2023.01)

(52) U.S. Cl.
CPC .............. *C02F 3/1268* (2013.01); *C02F 3/30* (2013.01); *C02F 2203/006* (2013.01); *C02F 2209/08* (2013.01); *C02F 2209/42* (2013.01)

(58) Field of Classification Search
CPC .... C02F 3/1268; C02F 3/30; C02F 2203/006; C02F 2209/08; C02F 2209/42
(Continued)

(56) References Cited

U.S. PATENT DOCUMENTS

| 2005/0077251 A1 | 4/2005 | Rieth et al. |
| 2022/0073390 A1 | 3/2022 | Messias de Araújo, Jr. |
| 2024/0294411 A1 | 9/2024 | Miyake et al. |

FOREIGN PATENT DOCUMENTS

| CN | 206188491 U | * 5/2017 |
| CN | 208361971 U | * 1/2019 |

(Continued)

OTHER PUBLICATIONS

Zhou et al, English machine translation CN 208361971 U, pp. 1-4 (Year: 2019).*

(Continued)

*Primary Examiner* — Claire A Norris (57) ABSTRACT

An intelligent modular membrane-based integrated apparatus for rural domestic sewage treatment includes: an influent regulating tank configured to hold untreated sewage; an influent tank, where a discharge outlet of the influent regulating tank communicates with a feed inlet of the influent tank through a first variable-frequency pump; and a membrane bio-reactor (MBR) membrane tank, where the MBR membrane tank communicates with the influent tank; a bottom of the MBR membrane tank is provided with multiple aeration assemblies; each aeration assembly corresponds to one MBR module; a valve is disposed on an effluent discharge pipe of each set of MBR module; and the effluent discharge pipe of the MBR module communicates with a main effluent discharge pipe through a second variable-frequency pump. The present disclosure significantly reduces power consumption for equipment operation, (Continued)

enhances biochemical reaction stability and treatment efficiency, and reduces carbon emissions.

9 Claims, 3 Drawing Sheets

(58) Field of Classification Search
USPC .......................................................... 210/614
See application file for complete search history.

(56) References Cited

FOREIGN PATENT DOCUMENTS

| | | |
|---|---|---|
| CN | 210505947 U | 5/2020 |
| CN | 117466431 A | 1/2024 |

OTHER PUBLICATIONS

Zhou et al, English machine translation CN 206188491 U, pp. 1-5 (Year: 2017).*

Internation Search Report of PCT/CN2024/124996, mailed Jan. 7, 2025.

* cited by examiner

INTELLIGENT MODULAR MEMBRANE-BASED INTEGRATED APPARATUS AND METHOD FOR RURAL DOMESTIC SEWAGE TREATMENT

CROSS-REFERENCE TO RELATED APPLICATIONS

This application is a continuation of International Patent Application No. PCT/CN2024/124996 with a filing date of Oct. 15, 2024, designating the United States, now, and further claims priority to Chinese Patent Application No. 202311343069.X with a filing date of Oct. 17, 2023. The content of the aforementioned applications, including any intervening amendments thereto, is incorporated herein by reference.

TECHNICAL FIELD

The present disclosure belongs to the technical field of sewage treatment, and in particular relates to an intelligent modular membrane-based integrated apparatus and method for rural domestic sewage treatment.

BACKGROUND

Rural domestic sewage primarily refers to domestic sewage generated from villagers' production and living activities in rural areas, mainly including four categories: kitchen sewage, toilet flushing sewage, laundry sewage, and bathing sewage. In rural domestic sewage treatment, the influent exhibits significant temporal variations in influent volume and pollutant concentration due to seasonal changes, population size, and lifestyle patterns, and also exhibits intermittency and instability. The membrane bio-reactor (MBR) process has gained substantial application in rural domestic sewage treatment owing to its advantages such as compact footprint, high shock load resistance, low excess sludge production, superior effluent quality, and ease of automated control. On one hand, the existing MBR process generally considers stable influent volume under design conditions, and all MBR membrane modules at the station operate in an integrated mode. Even when the influent volume is minimal, all membrane modules and aeration systems must still operate collectively. However, in reality, rural domestic sewage influent volumes during most periods are often lower than the design inflow volume. The sewage treatment station completes influent treatment within a short time, after which the entire sewage treatment station enters a shutdown state or the MBR membrane tank remains in idle aeration, resulting in over-aeration and energy waste. On the other hand, the MBR process combines biological treatment with membrane separation. The food-to-microorganism ratio (F/M ratio), a critical parameter for evaluating sludge loading, is defined as the mass of organic matter applied per unit weight of activated sludge per unit time. As the term implies, it represents the proportional relationship between the food (F-value) and microorganisms (M-value). When the MBR membrane tank operates under a high food-to-microorganism ratio, maintaining a relatively high dissolved oxygen (DO) level is beneficial, as it can accelerate the degradation rate of organic matter in the sewage. Conversely, when the MBR membrane tank operates under a low food-to-microorganism ratio, maintaining an elevated DO level will accelerate endogenous metabolism in the activated sludge due to food scarcity. This will ultimately lead to deflocculation in the activated sludge, a phenomenon commonly referred to as over-aeration. Therefore, in the operation of the MBR aeration membrane tank, aeration volume is closely linked to the control of the food-to-microorganism ratio. Under a high food-to-microorganism ratio, maintaining an elevated DO concentration can promote effective degradation of organic pollutants. Conversely, when the food-to-microorganism ratio is insufficient, adopting a relatively lower DO concentration can help reduce the endogenous metabolism rate, preventing sludge aging and deflocculation while lowering energy consumption and operational costs. The current process predominantly relies on operators' empirical assessments of sludge color and character to estimate sludge loading capacity, with manual adjustments of blower frequency, operational duration, or vent valve aperture to regulate DO levels in the MBR membrane tank. However, the lack of precision in the food-to-microorganism ratio determination compromises treatment efficiency, while the offline sampling analysis method fails to address issues promptly. Additionally, the alignment between the controlled value of the activated sludge concentration and the influent concentration is one of the critical factors that influence sewage treatment efficiency. The food-to-microorganism ratio is closely related to the activated sludge concentration. In practical operations at the rural domestic sewage treatment station, sludge discharge control primarily relies on operators' experience to determine the sludge discharge timing for regulating the sludge concentration. However, this often leads to poor alignment between the controlled value of the activated sludge concentration and the influent concentration, while station stability heavily depends on operators' experience. To achieve scientific and reasonable sludge discharge and maintain the sludge concentration within a reasonable range, there is an urgent need for an intelligent decision-support measure to further standardize and improve the accuracy of sludge discharge timing.

SUMMARY OF PRESENT INVENTION

In order to solve at least one of the technical problems mentioned in the background section, the present disclosure proposes an intelligent modular membrane-based integrated apparatus and method for rural domestic sewage treatment.

To achieve the above objective, the present disclosure adopts the following technical solutions.

An aspect of the present disclosure provides an intelligent modular membrane-based integrated apparatus for rural domestic sewage treatment, including:
  an influent regulating tank, configured to hold untreated sewage;
  an influent tank, where a discharge outlet of the influent regulating tank communicates with a feed inlet of the influent tank through a first variable-frequency pump; and
  a membrane bio-reactor (MBR) membrane tank, where the MBR membrane tank communicates with the influent tank; a bottom of the MBR membrane tank is provided with multiple sets of aeration assemblies; and each set of aeration assembly corresponds to a set of MBR module; and
  a valve is disposed on an effluent discharge pipe of each set of MBR module; the effluent discharge pipe of each set of MBR module communicates with a main effluent discharge pipe; and the main effluent discharge pipe is connected to a second variable-frequency pump.

Furthermore, valves are disposed at air inlet ends of the aeration assemblies, respectively; and the air inlet ends of the aeration assemblies communicate with an air outlet end of a variable-frequency blower.

Furthermore, a second liquid level sensor is disposed in the MBR membrane tank;
- a first liquid level sensor is disposed in the influent regulating tank;
- a biochemical oxygen demand (BOD) sensor is disposed in the influent tank;
- an online sludge concentration detector is disposed in the MBR membrane tank; and
- the valves on the effluent discharge pipes of each set of MBR module and valves at the air inlet ends of the aeration assemblies are electromagnetic valves.

Furthermore, an intermediate tank is disposed between the influent regulating tank and the influent tank; and an inlet and an outlet of the intermediate tank communicate with an outlet of the first variable-frequency pump and the feed inlet of the influent tank, respectively; and
- the intermediate tank is an anaerobic tank, an anoxic tank, or a combination of an anaerobic tank and an anoxic tank.

Furthermore, the first liquid level sensor, the second liquid level sensor, the BOD sensor, and the online sludge concentration detector are electrically connected to a controller. The electromagnetic valves are electrically connected to the controller through a driver.

Another aspect of the present disclosure provides a method using the intelligent modular membrane-based integrated apparatus for rural domestic sewage treatment provided in the above aspect, including the following steps:
- S1: acquiring, through a first liquid level sensor, liquid level information of the influent regulating tank; and acquiring, through a second liquid level sensor, liquid level information of the MBR membrane tank; and
- S2: adjusting, based on the liquid level information of the influent regulating tank and the liquid level information of the MBR membrane tank, flow rates of the first variable-frequency pump and the second variable-frequency pump, and adjusting opening states of the valve on the effluent discharge pipe of the MBR module and a valve at an air inlet end of the aeration assembly.

Furthermore, four liquid level thresholds are set for the influent regulating tank, including a high liquid level A, an intermediate liquid level B, a low liquid level C, and a minimum safe liquid level D in descending order;
- three liquid level thresholds are set for the MBR membrane tank, including a high liquid level G, an intermediate liquid level F, and a low liquid level E in descending order;
- the step S1 includes: determining, based on the liquid level information of the influent regulating tank acquired through the first liquid level sensor, a threshold range in which a liquid level of the influent regulating tank falls within; and
- determining, based on the liquid level information of the MBR membrane tank acquired through the second liquid level sensor, a threshold range in which a liquid level of the MBR membrane tank falls within;
- the step S2 involves the following operation modes:
- in a minimum liquid level operation mode, when the liquid level of the regulating tank is below the minimum safe liquid level D, the first variable-frequency pump and the second variable-frequency pump are deactivated;
- in the low liquid level operation mode, when the liquid level of the influent regulating tank is between the low liquid level C and the minimum safe liquid level D, the flow rate of the first variable-frequency pump is adjusted to align with a critical flux-based permeate flow of one set of MBR module; and when the liquid level of the MBR membrane tank reaches the intermediate liquid level F, an electromagnetic valve on the effluent discharge pipe of one set of MBR module is opened, the flow rate of the second variable-frequency pump is adjusted to align with the critical flux-based permeate flow of one set of MBR module, and the aeration assembly corresponding to the operating MBR module is activated;
- if the liquid level of the MBR membrane tank continues to rise to the high liquid level G, the first variable-frequency water pump is shut down; when the liquid level drops back to the intermediate liquid level F, the first variable-frequency water pump is started; if the liquid level of the MBR membrane tank decreases to the low liquid level E, the second variable-frequency water pump is shut down, and the corresponding aeration assembly is simultaneously deactivated; and when the liquid level recovers to the intermediate liquid level F, the second variable-frequency water pump is started, and the corresponding aeration assembly is activated;
- in an intermediate liquid level operation mode, when the liquid level of the influent regulating tank is between the intermediate liquid level B and the low liquid level C, the flow rate of the first variable-frequency pump is adjusted to align with the critical flux-based permeate flow of two sets of MBR modules; and when the liquid level of the MBR membrane tank reaches the intermediate liquid level F, the electromagnetic valves on the effluent discharge pipes of two sets of MBR modules are opened, the flow rate of the second variable-frequency pump is adjusted to align with the critical flux-based permeate flow of two sets of MBR modules, and two sets of aeration assemblies corresponding to the operating MBR modules are activated;
- if the liquid level of the MBR membrane tank continues to rise to the high liquid level G, the first variable-frequency water pump is shut down; when the liquid level drops back to the intermediate liquid level F, the first variable-frequency water pump is started; if the liquid level of the MBR membrane tank decreases to the low liquid level E, the second variable-frequency water pump is shut down, and the corresponding aeration assembly is simultaneously deactivated; and when the liquid level recovers to the intermediate liquid level F, the second variable-frequency water pump is started, and the corresponding aeration assembly is activated;
- in a high liquid level operation mode, when the liquid level of the influent regulating tank is between the high liquid level A and the intermediate liquid level B, the flow rate of the first variable-frequency pump is adjusted to align with the critical flux-based permeate flow of all the MBR modules; and when the liquid level of the MBR membrane tank reaches the intermediate liquid level F, the electromagnetic valves on the effluent discharge pipes of all the MBR modules are opened, the flow rate of the second variable-frequency pump is adjusted to align with the critical flux-based permeate flow of all the MBR modules, and all the aeration assemblies corresponding to the operating MBR modules are activated; and
- if the liquid level of the MBR membrane tank continues to rise to the high liquid level G, the first variable-frequency water pump is shut down; when the liquid level drops back to the intermediate liquid level F, the first variable-frequency water pump is started; if the liquid level of the MBR membrane tank decreases to the low liquid level E, the second variable-frequency water pump is shut down, and the corresponding aeration assembly is simultaneously deactivated; and when the liquid level recovers to the intermediate liquid level F, the second variable-frequency water pump is started, and the corresponding aeration assembly is activated.

Furthermore, in the low liquid level operation mode, the multiple sets of MBR modules and the corresponding aeration assemblies are alternately activated, with a different set of MBR module and the corresponding aeration assembly activated at an 8-hour interval; and in the intermediate liquid level operation mode, two sets of MBR modules and the corresponding aeration assemblies are selected non-repetitively from the multiple sets of MBR modules to form module combinations; and the module combinations are alternately activated, with a different module combination activated at an 8-hour interval.

Furthermore, in the step S2, in all the operation modes, before the aeration assembly is activated, whether to activate the aeration assembly is determined based on a food-to-microorganism ratio of sewage in the MBR membrane tank; the food-to-microorganism ratio is calculated as follows:

$$F/M = Q \times BOD_5/(MLSS \times Va)$$

where, F/M denotes the food-to-microorganism ratio; Q denotes an influent flow rate; $BOD_5$ denotes a $BOD_5$ value of influent; Va denotes an effective volume of the MBR membrane tank; and MLSS denotes an activated sludge concentration in the MBR membrane tank;

when the food-to-microorganism ratio is lower than a set lower threshold of the food-to-microorganism ratio, the aeration assembly is deactivated;

in the step S2, in all the operation modes, whether to perform a sludge discharge operation is determined by comparing a daily average activated sludge concentration with an upper threshold of the activated sludge concentration;

the upper threshold of the activated sludge concentration $MLSS_S$ is calculated as follows:

$$MLSS_S = Q \times BOD_5/(F/M_I \times Va)$$

where, $F/M_I$ denotes the lower threshold of the food-to-microorganism ratio; Q denotes the influent flow rate; $BOD_5$ denotes the $BOD_5$ value of the influent; Va denotes the effective volume of the MBR membrane tank; and MLSS denotes the activated sludge concentration in the MBR membrane tank; and when the daily average activated sludge concentration MLSS in the aeration tank exceeds the upper threshold of the activated sludge concentration $MLSS_S$ by 30%, an alarm message is issued to indicate that sludge discharge is required.

Furthermore, the low liquid level E of the MBR membrane tank is maintained no less than 20 cm above an upper surface of the MBR module.

Compared with the prior art, the intelligent modular membrane-based integrated apparatus and method for rural domestic sewage treatment provided by the present disclosure have the following beneficial effects.

(1) In the present disclosure, the intelligent modular membrane-based integrated apparatus for rural domestic sewage treatment optimizes membrane module operation by determining the number of activated MBR modules and the flow rate of the first variable-frequency pump based on the influent volume. Thus, the present disclosure significantly reduces power consumption for equipment operation and reduces carbon emissions.

(2) In the present disclosure, the intelligent modular membrane-based integrated method for rural domestic sewage treatment integrates the online BOD sensor with the online sludge concentration analyzer. The present disclosure acquires the food-to-microorganism ratio data of the MBR membrane tank in real-time through the station's intelligent management platform to intelligently adjust aeration duration and airflow, preventing sludge aging and deflocculation. The present disclosure improves the stability of biochemical reactions and treatment efficiency by analyzing the relationship between the food-to-microorganism ratio and activated sludge concentration to better adjust the activated sludge concentration, thereby identifying an appropriate proportional relationship between the activated sludge concentration and influent organic concentration. In this way, the present disclosure enhances biochemical reaction stability and treatment efficiency, and effectively enhances the effluent compliance rate.

BRIEF DESCRIPTION OF THE DRAWINGS

As a part of the present disclosure, the drawings of the specification provide further understanding of the present disclosure. The schematic embodiments of the present disclosure and description thereof are intended to explain the present disclosure and are not intended to constitute an improper limitation to the present disclosure. In the drawings.

REFERENCE NUMERALS 1. influent regulating tank; 2. influent tank; 3. MBR membrane tank; 4. MBR module; and 5. aeration assembly.

DETAILED DESCRIPTION OF THE EMBODIMENTS

It should be noted that embodiments in the present disclosure or features in the embodiments may be combined with one another without conflict.

It should be understood that in the description of the present disclosure, terms such as "central", "longitudinal", "transverse", "upper", "lower", "front", "rear", "left", "right", "vertical", "horizontal", "top", "bottom", "inside" and "outside" indicate the orientation or positional relationships based on the drawings. They are merely intended to facilitate and simplify the description of the present disclosure, rather than to indicate or imply that the mentioned apparatus or components must have a specific orientation or must be constructed and operated in a specific orientation. Therefore, these terms should not be construed as a limitation to the present disclosure. Moreover, terms such as "first" and "second" are used only for the purpose of description and cannot be understood as indicating or implying relative importance or implicitly indicating the number of technical features denoted. Thus, features defined with "first" and "second" may explicitly or implicitly include one or more of the features. In the description of the present disclosure, unless otherwise specified, "a plurality of" means at least two.

In the description of the present disclosure, it should be noted that, unless otherwise clearly specified, meanings of terms "mount", "connected with", and "connected to" should be understood in a broad sense. For example, the connection may be a fixed connection, a removable connection, or an integral connection; may be a mechanical connection or an electrical connection; may be a direct connection or an indirect connection by using an intermediate medium; or may be intercommunication between two elements. A person of ordinary skill in the art may understand specific meanings of the above terms in the present disclosure based on a specific situation.

The present disclosure will be described in detail below with reference to the drawings and the embodiments.

Figure 1:
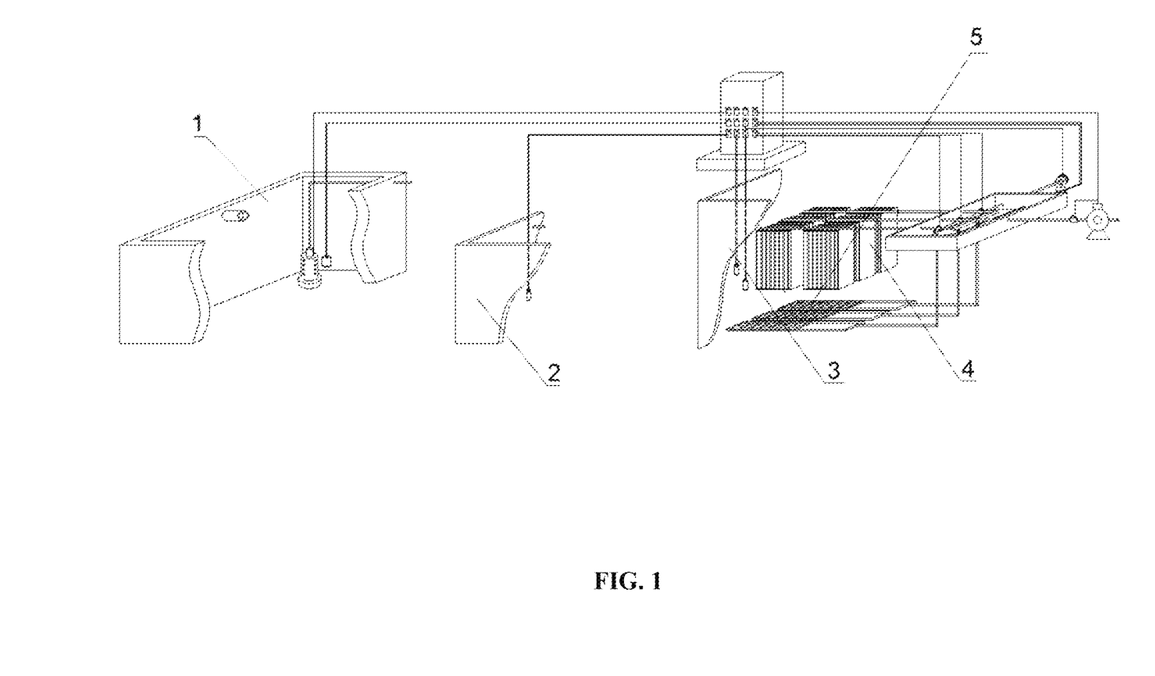
FIG. 1 is a structural schematic diagram of an apparatus for rural domestic sewage treatment according to an embodiment of the present disclosure.

As shown in FIG. 1, an intelligent modular membrane-based integrated apparatus for rural domestic sewage treatment includes: an influent regulating tank 1, an influent tank 2, and an MBR membrane tank 3.

The influent regulating tank 1 is configured to hold untreated sewage.

A discharge outlet of the influent regulating tank 1 communicates with a feed inlet of the influent tank 2 through a first variable-frequency pump.

Figure 3:
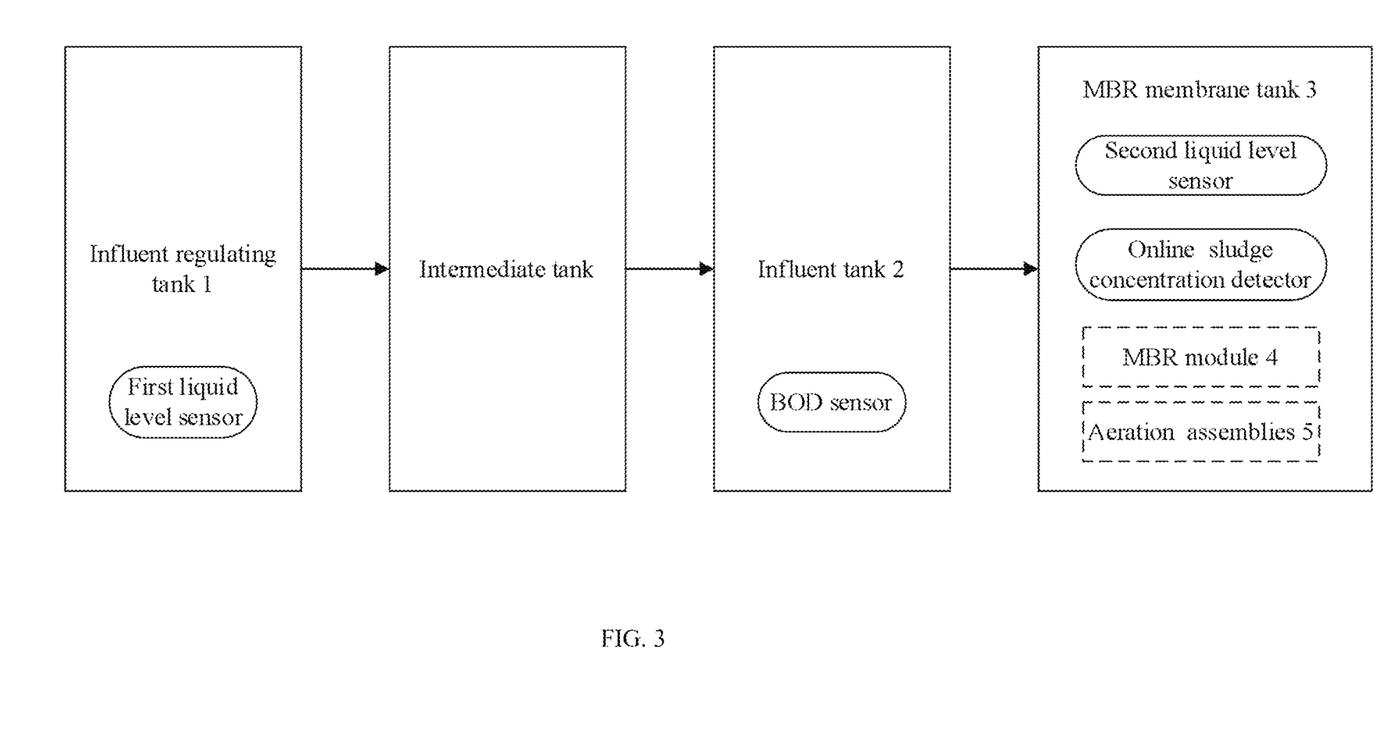
FIG. 3 is a structural schematic diagram of an apparatus for rural domestic sewage treatment according to an embodiment of the present disclosure.

As shown in FIG. 3, the MBR membrane tank 3 communicates with the influent tank 2. Three sets of aeration assemblies 5 are disposed at a bottom of the MBR membrane tank 3. Each set of aeration assembly 5 corresponds to a set of MBR module 4.

A valve is disposed on an effluent discharge pipe of each set of MBR module 4. The effluent discharge pipe of each set of MBR module 4 communicates with a main effluent discharge pipe. The main effluent discharge pipe is connected to a second variable-frequency pump. Valves are disposed at air inlet ends of the aeration assemblies 5, respectively. The air inlet ends of the aeration assemblies 5 communicate with an air outlet end of a variable-frequency blower.

A second liquid level sensor is disposed in the MBR membrane tank 3.

A first liquid level sensor is disposed in the influent regulating tank 1.

A biochemical oxygen demand (BOD) sensor is disposed in the influent tank 2.

An online sludge concentration detector is disposed in the MBR membrane tank 3.

The valves on the effluent discharge pipes of the MBR modules 4 and valves at the air inlet ends of the aeration assemblies 5 are electromagnetic valves.

An intermediate tank is disposed between the influent regulating tank 1 and the influent tank 2. An inlet and an outlet of the intermediate tank communicate with an outlet of the first variable-frequency pump and the feed inlet of the influent tank 2 respectively.

In some embodiments, the intermediate tank is an anaerobic tank. In some other embodiments, the intermediate tank is an anoxic tank. In some other embodiments, the intermediate tank is a combination of an anaerobic tank and an anoxic tank.

The MBR module 4 is an MBR composed of multiple MBR membrane element. The MBR is a novel sewage treatment system combining membrane separation technology with biological treatment technology. The membrane module replaces the terminal secondary sedimentation tank in conventional biological treatment technology to maintain high activated sludge concentration in the bioreactor. The design improves organic loading capacity of biological treatment, reduces land occupation of sewage treatment facilities, and minimizes excess sludge production through low sludge loading. The system primarily uses a membrane separation apparatus immersed in the aerobic biological tank to intercept activated sludge and macromolecular organic matter in the tank. The activated sludge concentration (mixed liquor suspended solids, MLSS) in the membrane bioreactor system can reach 8,000-10,000 mg/L or higher. Sludge retention time (SRT) can be extended beyond 30 days. The MBR is prior art, and its specific structure and connection form are not elaborated herein.

The first liquid level sensor, the second liquid level sensor, the BOD sensor, and the online sludge concentration detector are electrically connected to a controller. The electromagnetic valves are electrically connected to the controller through a driver.

The aeration assembly 5 includes multiple straight pipes communicating with the variable-frequency blower. The straight pipes are provided with through holes for air outflow.

The first liquid level sensor and the second liquid level sensor include but are not limited to existing radio frequency (RF) admittance/capacitance level meters. The BOD sensor includes but is not limited to existing optical, electronic, and microbial technologies. The product model of the BOD microbial sensor rapid analyzer is JXSZ-1001-BOD. The online sludge concentration detector includes but is not limited to the existing online sludge concentration analyzer TSS-6212. The electromagnetic valves include but are not limited to the existing flying saucer piston electromagnetic valve HOPE91. The first variable-frequency water pump and the second variable-frequency water pump include but are not limited to existing variable-frequency water pumps. The controller controls a frequency converter to change the rotational speed of the variable-frequency water pump and thereby adjust the flow rate of the variable-frequency water pump, which constitutes prior art. The variable-frequency blower includes but is not limited to a variable-frequency motor-driven axial flow blower. The controller controls the frequency converter to change the rotational speed of the variable-frequency blower and thereby adjust the blower flow rate, which constitutes prior art. The controller includes but is not limited to existing industrial computers or programmable logic controller (PLC). Programs are set in the industrial computer or PLC to adjust the opening of the electromagnetic valves and control the first variable-frequency water pump and the second variable-frequency water pump based on liquid level information, which constitutes prior art and is not elaborated herein.

The operating process of the apparatus is as follows.

Figure 2:
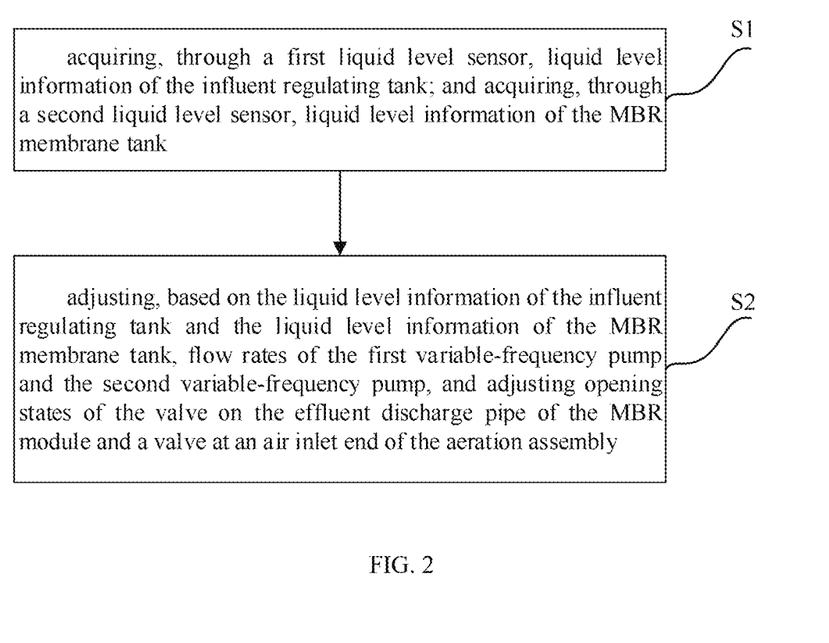
FIG. 2 is a flowchart showing a method for rural domestic sewage treatment according to an embodiment of the present disclosure.

As shown in FIG. 2, an intelligent modular membrane-based integrated method for rural domestic sewage treatment using the intelligent modular membrane-based integrated apparatus for rural domestic sewage treatment provided in the above aspect includes the following steps.

S1. The liquid level information of the influent regulating tank 1 is acquired through the first liquid level sensor.

The liquid level information of the MBR membrane tank 3 is acquired through the second liquid level sensor.

S2. Flow rates of the first variable-frequency pump and the second variable-frequency pump are adjusted based on the liquid level information of the influent regulating tank 1 and the liquid level information of the MBR membrane tank 3. Opening states of the valves on the effluent discharge pipes of the MBR modules 4 and the valves at the air inlet ends of the aeration assemblies 5 are adjusted.

Four liquid level thresholds are set for the influent regulating tank 1, including a high liquid level A, an intermediate liquid level B, a low liquid level C, and a minimum safe liquid level D in descending order.

Three liquid level thresholds are set for the MBR membrane tank 3, including a high liquid level G, an intermediate liquid level F, and a low liquid level E in descending order.

In the step S1, based on the liquid level information of the influent regulating tank 1 acquired through the first liquid level sensor, it is determined a threshold range in which a liquid level of the influent regulating tank 1 falls within.

Based on the liquid level information of the MBR membrane tank 3 acquired through the second liquid level sensor, it is determined a threshold range in which a liquid level of the MBR membrane tank 3 falls within.

In the step S2, the following operation modes are set.

In a minimum liquid level operation mode, when the liquid level of the regulating tank is below the minimum safe liquid level D, the first variable-frequency pump and the second variable-frequency pump are deactivated.

In a low liquid level operation mode, when the liquid level of the influent regulating tank 1 is between the low liquid level C and the minimum safe liquid level D, the flow rate of the first variable-frequency pump is adjusted to align with a critical flux-based permeate flow of one set of MBR module 4. When the liquid level of the MBR membrane tank 3 reaches the intermediate liquid level F, the electromagnetic valves on the effluent discharge pipes of one set of MBR module 4 are opened. The flow rate of the second variable-frequency pump is adjusted to align with the critical flux-based permeate flow of one set of MBR module 4. The aeration assembly 5 corresponding to the operating MBR module 4 is activated.

If the liquid level of the MBR membrane tank 3 continues to rise to the high liquid level G, the first variable-frequency water pump is shut down. When the liquid level drops back to the intermediate liquid level F, the first variable-frequency water pump is started. If the liquid level of the MBR membrane tank 3 decreases to the low liquid level E, the second variable-frequency water pump is shut down, and the corresponding aeration assembly 5 is simultaneously deactivated. When the liquid level recovers to the intermediate liquid level F, the second variable-frequency water pump is started, and the corresponding aeration assembly 5 is activated.

In an intermediate liquid level operation mode, when the liquid level of the influent regulating tank 1 is between the intermediate liquid level B and the low liquid level C, the flow rate of the first variable-frequency pump is adjusted to align with the critical flux-based permeate flow of two sets of MBR modules 4. When the liquid level of the MBR membrane tank 3 reaches the intermediate liquid level F, the electromagnetic valves on the effluent discharge pipes of two sets of MBR modules 4 are opened. The flow rate of the second variable-frequency pump is adjusted to align with the critical flux-based permeate flow of two sets of MBR modules 4. Two sets of aeration assemblies 5 corresponding to the operating MBR modules 4 are activated.

If the liquid level of the MBR membrane tank 3 continues to rise to the high liquid level G, the first variable-frequency water pump is shut down. When the liquid level drops back to the intermediate liquid level F, the first variable-frequency water pump is started. If the liquid level of the MBR membrane tank 3 decreases to the low liquid level E, the second variable-frequency water pump is shut down, and the corresponding aeration assembly 5 is simultaneously deactivated. When the liquid level recovers to the intermediate liquid level F, the second variable-frequency water pump is started, and the corresponding aeration assembly 5 is activated.

In a high liquid level operation mode, when the liquid level of the influent regulating tank 1 is between the high liquid level A and the intermediate liquid level B, the flow rate of the first variable-frequency pump is adjusted to align with the critical flux-based permeate flow of all the MBR modules 4. When the liquid level of the MBR membrane tank 3 reaches the intermediate liquid level F, the electromagnetic valves on the effluent discharge pipes of all the MBR modules 4 are opened. The flow rate of the second variable-frequency pump is adjusted to align with the critical flux-based permeate flow of all the MBR modules 4. All the aeration assemblies 5 corresponding to the operating MBR modules 4 are activated.

If the liquid level of the MBR membrane tank 3 continues to rise to the high liquid level G, the first variable-frequency water pump is shut down. When the liquid level drops back to the intermediate liquid level F, the first variable-frequency water pump is started. If the liquid level of the MBR membrane tank 3 decreases to the low liquid level E, the second variable-frequency water pump is shut down, and the corresponding aeration assembly 5 is simultaneously deactivated. When the liquid level recovers to the intermediate liquid level F, the second variable-frequency water pump is started, and the corresponding aeration assembly 5 is activated.

In the low liquid level operation mode, the three sets of MBR modules 4 and the corresponding aeration assemblies 5 are alternately activated, with a different set of MBR module 4 and the corresponding aeration assembly 5 activated at an 8-hour interval.

In the intermediate liquid level operation mode, two sets of MBR modules 4 and the corresponding aeration assemblies 5 are selected non-repetitively from the three sets of MBR modules 4 to form module combinations, and the module combinations are alternately activated, with a different module combination activated at an 8-hour interval.

In the step S2, in all the operation modes, before the aeration assembly 5 is activated, it is determined whether to activate the aeration assembly 5 based on a food-to-microorganism ratio of sewage in the MBR membrane tank 3.

The food-to-microorganism ratio is calculated as follows:

$$F/M = Q \times BOD_5/(MLSS \times Va)$$

where, F/M denotes the food-to-microorganism ratio; Q denotes an influent flow rate; $BOD_5$ denotes a $BOD_5$ value of influent, acquired by the BOD sensor; Va denotes an effective volume of the MBR membrane tank; and MLSS denotes activated sludge concentration in the MBR membrane tank, acquired by the online sludge concentration detector.

When the MBR membrane tank 3 operates within a suitable food-to-microorganism ratio range, the activated sludge floc structure remains intact with excellent settling performance to produce clear and transparent effluent. When the MBR membrane tank 3 operates under a high food-to-microorganism ratio or overload conditions, excessive food causes deteriorated settling performance of the activated sludge, turbid effluent, and incomplete BOD degradation. Maintaining a relatively high DO concentration is advantageous to accelerate organic matter degradation. When the MBR membrane tank 3 operates under a low food-to-microorganism ratio, food deficiency will induce aging of the activated sludge. Prolonged operation under a low food-to-microorganism ratio may cause sludge deflocculation or filamentous bacteria bulking in the activated sludge. The aging and deflocculation of the activated sludge can lead to loose activated sludge floc structures, resulting in effluent contamination with fine sludge fragments and effluent quality deterioration. In this case, aeration reduction, relatively low DO control, and timely sludge discharge operations should be implemented.

Operational process tests are conducted on the treatment apparatus to obtain the stable food-to-microorganism ratio range for prolonged compliant effluent discharge. Upper and lower limits of the food-to-microorganism ratio range are defined as lower and upper thresholds for the food-to-microorganism ratio, respectively.

When the food-to-microorganism ratio is lower than the set lower threshold of the food-to-microorganism ratio, the aeration assembly 5 is deactivated.

When the food-to-microorganism ratio is higher than the set upper threshold of the food-to-microorganism ratio, all the aeration assemblies 5 are activated.

The deactivation and activation operations of the aeration assembly 5 have a highest priority. Specifically, when a conflict occurs between a food-to-microorganism ratio-based deactivation/activation command for the aeration assembly 5 and other aeration control commands, the food-to-microorganism ratio-based deactivation/activation command for the aeration assembly 5 is prioritized.

Meanwhile, considering the aeration assembly 5 in the MBR membrane tank 3 also functions to dislodge attached pollutants, the logic settings for the deactivation period of the aeration assembly 5 may incorporate a timed duration based on practical conditions.

In the step S2, it is determined whether to perform a sludge discharge operation by comparing a daily average activated sludge concentration with the upper threshold of the activated sludge concentration in all the operation modes.

The upper threshold of the activated sludge concentration $MLSS_S$ is calculated as follows:

$$MLSS_S = Q \times BOD_5 / (F/M_l \times Va)$$

where, $F/M_l$ denotes the lower threshold of the food-to-microorganism ratio; Q denotes the influent flow rate; $BOD_5$ denotes the $BOD_5$ value of the influent; Va denotes the effective volume of the MBR membrane tank; and MLSS denotes the activated sludge concentration in the MBR membrane tank.

An alarm message is issued to indicate that sludge discharge is required when the daily average activated sludge concentration MLSS in the aeration tank exceeds the upper threshold of the activated sludge concentration $MLSS_S$ by 30%.

The low liquid level E of the MBR membrane tank 3 is maintained no less than 20 cm above an upper surface of the MBR module 4.

The present disclosure has the following beneficial effects.

1) The present disclosure optimizes membrane module operation by determining the number of activated MBR modules 4 and the rotational frequency of the first variable-frequency pump based on the influent volume. Thus, the present disclosure significantly reduces power consumption for equipment operation and reduces carbon emissions.

2) The present disclosure integrates the online BOD sensor with the online sludge concentration analyzer. The present disclosure acquires the food-to-microorganism ratio data of the MBR membrane tank 3 in real-time through the station's intelligent management platform to intelligently adjust aeration duration and airflow, preventing sludge aging and deflocculation. Simultaneously, the present disclosure provides scientific and intelligent reminders for activated sludge discharge timing in the membrane tank, enhancing biochemical reaction stability and treatment efficiency.

3) Compared with the original process, the present disclosure adopts grouped operation and determines the number of operating membrane modules based on the influent volume, enabling the entire sewage treatment system to maintain long-term stable operation. The present disclosure can prevent frequent shutdowns or idle aeration caused by insufficient influent volume to support the system's treatment capacity. This effectively maintains sludge-microorganism balance in the bioreactor and preserves favorable character of the MBR biofilm.

4) The present disclosure extends offline cleaning cycle of MBR membrane elements.

Over-aeration disrupts sludge flocs, alters sludge particle sizes and distribution, and releases more colloidal/dissolved organic matter (extracellular polymeric substances (EPS) and soluble microbial products (SMP)), thereby accelerating membrane fiber fouling. The present disclosure implements intelligent aeration control by adjusting the aeration volume according to F/M ratio variations, maintaining the aeration volume within a scientific and reasonable range.

During modular operation, non-operating MBR modules 4 exhibit no suction effect on sewage. Pollutants on membrane surfaces loosen and detach under gravitational forces. Combined with aeration disturbance, this promotes detachment of pollutants and aging biofilm from membrane fibers, positively extending membrane fouling cycles.

Modular operation increases hydraulic retention time (HRT), providing microorganisms extended durations for nutrient digestion and decomposition, thereby reducing membrane fouling risks.

The flow rates of the first variable-frequency pump and the second variable-frequency pump at each speed setting are equivalent to the critical flux-based permeate flow of their corresponding modules. Operating all modules at critical flux can significantly retard the membrane fouling rate.

Finally, it should be noted that the above embodiments are provided merely for describing the technical solutions of the present disclosure, but not for limiting the present disclosure. Although the present disclosure is described in detail with reference to the above embodiments, a person of ordinary skill in the art should understand that they may still make modifications to the technical solutions described in the above embodiments or make equivalent replacements to some or all technical features thereof; and these modifications or replacements do not make the essence of the corresponding technical solution depart from the scope of the technical solutions of the embodiments of the present disclosure, and shall fall within the scope of claims and specification of the present disclosure.

The above described are merely preferred embodiments of the present disclosure, and not intended to limit the present disclosure. Any modifications, equivalent replacements and improvements made within the spirit and principle of the present disclosure should all fall within the scope of protection of the present disclosure.

What is claimed is:

1. A method for rural domestic sewage treatment using an intelligent modular membrane-based integrated sewage treatment apparatus, wherein the sewage treatment apparatus comprises:
    an influent regulating tank (1), configured to hold untreated sewage;
    an influent tank (2), wherein a discharge outlet of the influent regulating tank (1) communicates with a feed inlet of the influent tank (2) through a first variable-frequency pump; and
    a membrane bio-reactor (MBR) membrane tank (3), wherein the MBR membrane tank (3) communicates with the influent tank (2); a bottom of the MBR membrane tank (3) is provided with multiple aeration assemblies (5); the MBR membrane tank (3) comprises multiple MBR modules (4), and the multiple aeration assemblies (5) correspond to the multiple MBR modules (4) one by one;
    a valve is disposed on an effluent discharge pipe of each MBR module (4); the effluent discharge pipe of the MBR module (4) communicates with a main effluent discharge pipe;
    and the main effluent discharge pipe is connected to a second variable-frequency pump; and
    the method for rural domestic sewage treatment comprises the following steps:
    S1: acquiring, through a first liquid level sensor, liquid level information of the influent regulating tank (1); and
    acquiring, through a second liquid level sensor, liquid level information of the MBR membrane tank (3); and
    S2: adjusting, based on the liquid level information of the influent regulating tank (1) and the liquid level information of the MBR membrane tank (3), flow rates of the first variable-frequency pump and the second variable-frequency pump, and adjusting opening states of the valves on the effluent discharge pipes of the multiple MBR modules (4) and valves with each arranged at an air inlet end of each aeration assembly (5);
    wherein, four liquid level thresholds are set for the influent regulating tank (1), comprising a high liquid level A, an intermediate liquid level B, a low liquid level C, and a minimum safe liquid level D in descending order;
    three liquid level thresholds are set for the MBR membrane tank (3), comprising a high liquid level G, an intermediate liquid level F, and a low liquid level E in descending order;
    the step S1 comprises: determining, based on the liquid level information of the influent regulating tank (1) acquired through the first liquid level sensor, a threshold range in which a liquid level of the influent regulating tank (1) falls within; and
    determining, based on the liquid level information of the MBR membrane tank (3) acquired through the second liquid level sensor, a threshold range in which a liquid level of the MBR membrane tank (3) falls within;
    the step S2 involves a minimum liquid level operation mode, a low liquid level operation mode, an intermediate liquid level operation mode, and a high liquid level operation mode:
    in the minimum liquid level operation mode, when the liquid level of the influent regulating tank is below the minimum safe liquid level D, the first variable-frequency pump and the second variable-frequency pump are deactivated;
    in the low liquid level operation mode, when the liquid level of the influent regulating tank (1) is between the low liquid level C and the minimum safe liquid level D, the flow rate of the first variable-frequency pump is adjusted to align with a critical flux-based permeate flow of one of the multiple MBR modules (4); and when the liquid level of the MBR membrane tank (3) reaches the intermediate liquid level F the valve on the effluent discharge pipe of the one of the multiple MBR modules (4) is opened, the flow rate of the second variable-frequency pump is adjusted to align with the critical flux-based permeate flow of the one of the multiple MBR modules (4), and the aeration assembly (5) corresponding to the operating MBR module (4) is activated; and
    when the liquid level of the MBR membrane tank (3) continues to rise to the high liquid level G, the first variable-frequency pump is shut down; when the liquid level drops back to the intermediate liquid level F, the first variable-frequency pump is started; when the liquid level of the MBR membrane tank (3) decreases to the low liquid level E, the second variable-frequency pump is shut down, and the aeration assembly (5) corresponding to the operating MBR module (4) is simultaneously deactivated; and when the liquid level recovers to the intermediate liquid level F, the second variable-frequency pump is started, and the aeration assembly (5) corresponding to the operating MBR module (4) is activated.

2. The method for rural domestic sewage treatment according to claim 1, wherein valves are disposed at air inlet ends of the multiple aeration assemblies (5), respectively; and the air inlet ends of the multiple aeration assemblies (5) communicate with an air outlet end of a variable-frequency blower.

3. The method for rural domestic sewage treatment according to claim 2, wherein the second liquid level sensor is disposed in the MBR membrane tank (3);
    the first liquid level sensor is disposed in the influent regulating tank (1);
    a biochemical oxygen demand (BOD) sensor is disposed in the influent tank (2);
    an online sludge concentration detector is disposed in the MBR membrane tank (3); and
    the valves on the effluent discharge pipes of the multiple MBR modules (4) and the valves at the air inlet ends of the multiple aeration assemblies (5) are electromagnetic valves.

4. The method for rural domestic sewage treatment according to claim 1, wherein an intermediate tank is disposed between the influent regulating tank (1) and the influent tank (2); and an inlet and an outlet of the intermediate tank communicate with an outlet of the first variable-frequency pump and the feed inlet of the influent tank (2), respectively; and the intermediate tank is an anaerobic tank, an anoxic tank, or a combination of an anaerobic tank and an anoxic tank.

5. The method for rural domestic sewage treatment according to claim 3, wherein the first liquid level sensor, the second liquid level sensor, the BOD sensor, and the online sludge concentration detector are electrically connected to a controller; and the electromagnetic valves are electrically connected to the controller through a driver.

6. The method for rural domestic sewage treatment according to claim 1, wherein in the intermediate liquid level operation mode, when the liquid level of the influent regulating tank (1) is between the intermediate liquid level B and the low liquid level C, the flow rate of the first variable-frequency pump is adjusted to align with the critical flux-based permeate flow of two of the multiple MBR modules (4); and when the liquid level of the MBR membrane tank (3) reaches the intermediate liquid level F, the electromagnetic valves on the effluent discharge pipes of the two MBR modules (4) are opened, the flow rate of the second variable-frequency pump is adjusted to align with the critical flux-based permeate flow of the two of the multiple MBR modules (4), and two of the multiple aeration assemblies (5) corresponding to the operating MBR modules (4) are activated;

when the liquid level of the MBR membrane tank (3) continues to rise to the high liquid level G, the first variable-frequency water pump is shut down; when the liquid level drops back to the intermediate liquid level F, the first variable-frequency water pump is started; if the liquid level of the MBR membrane tank (3) decreases to the low liquid level E, the second variable-frequency water pump is shut down, and the aeration assembly (5) corresponding to the operating MBR module (4) is simultaneously deactivated; and when the liquid level recovers to the intermediate liquid level F, the second variable-frequency water pump is started, and the aeration assembly (5) corresponding to the operating MBR module (4) is activated;

in the high liquid level operation mode, when the liquid level of the influent regulating tank (1) is between the high liquid level A and the intermediate liquid level B, the flow rate of the first variable-frequency pump is adjusted to align with the critical flux-based permeate flow of all the MBR modules (4); and when the liquid level of the MBR membrane tank (3) reaches the intermediate liquid level F, the electromagnetic valves on the effluent discharge pipes of all the MBR modules (4) are opened, the flow rate of the second variable-frequency pump is adjusted to align with the critical flux-based permeate flow of all the MBR modules (4), and all the aeration assemblies (5) corresponding to the operating MBR modules (4) are activated; and when the liquid level of the MBR membrane tank (3) continues to rise to the high liquid level G, the first variable-frequency water pump is shut down; when the liquid level drops back to the intermediate liquid level F, the first variable-frequency water pump is started; if the liquid level of the MBR membrane tank (3) decreases to the low liquid level E, the second variable-frequency water pump is shut down, and the aeration assembly (5) corresponding to the operating MBR module (4) is simultaneously deactivated; and when the liquid level recovers to the intermediate liquid level F, the second variable-frequency water pump is started, and the aeration assembly (5) corresponding to the operating MBR module (4) is activated.

7. The method for rural domestic sewage treatment according to claim 6, wherein in the low liquid level operation mode, the multiple MBR modules (4) and the corresponding aeration assemblies (5) are alternately activated, with a different set of MBR module (4) and the aeration assembly (5) corresponding to the operating MBR module (4) activated at an 8-hour interval; and in the intermediate liquid level operation mode, the two of the multiple MBR modules (4) and the corresponding aeration assemblies (5) are selected non-repetitively to form module combinations; and the module combinations are alternately activated, with a different module combination activated at an 8-hour interval.

8. The method for rural domestic sewage treatment according to claim 6, wherein in the step S2, in all the operation modes, before the aeration assembly (5) is activated, whether to activate the aeration assembly (5) is determined based on a food-to-microorganism ratio of sewage in the MBR membrane tank (3);

the food-to-microorganism ratio is calculated as follows:

$$F/M = Q \times BOD_5/(MLSS \times Va)$$

wherein, F/M denotes the food-to-microorganism ratio; Q denotes an influent flow rate; $BOD_5$ denotes a $BOD_5$ value of influent; Va denotes an effective volume of the MBR membrane tank; and MLSS denotes an activated sludge concentration in the MBR membrane tank;

when the food-to-microorganism ratio is lower than a set lower threshold of the food-to-microorganism ratio, the aeration assembly (5) is deactivated;

in the step S2, in all the operation modes, whether to perform a sludge discharge operation is determined by comparing a daily average activated sludge concentration with an upper threshold of the activated sludge concentration;

the upper threshold of the activated sludge concentration $MLSS_S$ is calculated as follows:

$$MLSS_S = Q \times BOD_5/(F/M_l \times Va)$$

wherein, $F/M_l$ denotes the lower threshold of the food-to-microorganism ratio; Q denotes the influent flow rate; $BOD_5$ denotes the $BOD_5$ value of the influent; Va denotes the effective volume of the MBR membrane tank; and MLSS denotes the activated sludge concentration in the MBR membrane tank; and when the daily average activated sludge concentration MLSS in the MBR membrane tank exceeds the upper threshold of the activated sludge concentration $MLSS_S$ by 30%, an alarm message is issued to indicate that sludge discharge is required.

9. The method for rural domestic sewage treatment according to claim 6, wherein the low liquid level E of the MBR membrane tank (3) is maintained no less than 20 cm above an upper surface of the MBR module (4).

\* \* \* \* \*